US010035204B2

(12) United States Patent
Gilman et al.

(10) Patent No.: US 10,035,204 B2
(45) Date of Patent: Jul. 31, 2018

(54) SAW BLADE INDEXING ASSEMBLY

(71) Applicant: Simonds International LLC, Fitchburg, MA (US)

(72) Inventors: David Gilman, Camas, WA (US); Jeremiah Gilbert, Portland, OR (US); Marc Elkins, Washougal, WA (US); Derek Clark, Portland, OR (US); Larry McMaster, Troutdale, OR (US)

(73) Assignee: Simonds International, LLC, Fitchburg, MA (US)

( * ) Notice: Subject to any disclaimer, the term of this patent is extended or adjusted under 35 U.S.C. 154(b) by 0 days.

(21) Appl. No.: 15/167,112

(22) Filed: May 27, 2016

(65) Prior Publication Data

US 2016/0346852 A1    Dec. 1, 2016

Related U.S. Application Data

(63) Continuation-in-part of application No. 14/292,420, filed on May 30, 2014, now Pat. No. 9,527,147.

(51) Int. Cl.
*B24B 49/10* (2006.01)
*B23D 63/14* (2006.01)
*B23D 63/00* (2006.01)

(52) U.S. Cl.
CPC ......... *B23D 63/005* (2013.01); *B23D 63/008* (2013.01); *B23D 63/14* (2013.01)

(58) Field of Classification Search
CPC ...... B23D 63/005; B23D 63/00; B23D 63/14; B23D 63/008
USPC ............................................. 451/45, 5, 8–10
See application file for complete search history.

(56) References Cited

U.S. PATENT DOCUMENTS 4,357,841 A * 11/1982 Mote ..................... B23D 63/14
76/41
4,819,515 A * 4/1989 Pfaltzgraff ........... B23D 63/005
451/17

\* cited by examiner

*Primary Examiner* — Robert Rose
(74) *Attorney, Agent, or Firm* — Duquette Law Group, LLC

(57) ABSTRACT

A circular saw blade indexing assembly includes a base and a circular saw blade mounting assembly connected to the base and having a saw hub configured to support a circular saw blade. The circular saw blade indexing assembly includes an indexing mechanism connected to the base and having a feed finger disposed at a radial distance from the saw hub, the feed finger configured to rotate the circular saw blade about the saw hub between a first arc position and a second arc position. The circular saw blade indexing assembly includes a radius adjustment mechanism configured to adjust a relative longitudinal position between the saw hub of the circular saw blade mounting assembly and the feed finger of the indexing mechanism.

20 Claims, 14 Drawing Sheets

SAW BLADE INDEXING ASSEMBLY

RELATED APPLICATIONS

This patent application is a continuation-in-part of, and claims the benefit of, U.S. Utility application Ser. No. 14/292,420, filed on May 30, 2014, entitled, "Saw Blade Indexing Assembly," the contents and teachings of which are hereby incorporated by reference in their entirety.

BACKGROUND

To extend the life of a circular saw blade, the sawmill industry utilizes sharpening or profiling machines for regrinding the top and face portions of the teeth of the blade. In order to grind each tooth of a circular saw blade, the saw mill industry utilizes a variety of mechanisms to hold and position the saw blade relative to a grinder so that the teeth can be ground one at a time. For example, conventional sharpening machines include an indexing mechanism having a feed finger that contacts each saw tooth and rotates each tooth toward the grinder or grinding wheel. The indexing mechanism is conventionally actuated by either a linear actuator or by a cam assembly. Once in position, the sharpening machine plunges the grinding wheel into a gullet between adjacent teeth of the saw blade to sharpen a cutting face of the tooth.

SUMMARY

Conventional indexing mechanisms suffer from a variety of deficiencies. For example, for a sharpening machine utilizing a linear actuator to index the saw blade, the fixed relationship of the feed finger and the grinder require that the saw blade be carefully indexed according to a given spacing of the teeth. However, for saw blades having irregularly spaced teeth, as the feed finger contacts the gullet of a tooth and rotates the tooth toward the grinding wheel, the feed finger of the indexing mechanism can slip along the profile of the face of the tooth, rather than remain in a substantially constant location. Because the feed finger does not remain in the same location relative to the face of each tooth, the speed at which the feed finger advances the saw blade relative to the grinder will not be consistent. These inconsistent velocities can lead to the indexing mechanism positioning each tooth in a relatively different location relative to the grinder, which can lead to overgrinding of each tooth. This issue can be compounded during a sharpening process, as the indexing mechanism typically rotates the saw blade between two and three times past the grinder to provide the saw blade with a particular level of sharpness.

In another example, for a sharpening machine utilizing a cam assembly to drive the indexing mechanism to advance the saw blade, the indexing mechanism is configured to follow the arc of the cam. However, in certain cases, the axis of rotation of the indexing mechanism can be offset from the center of rotation of the cam. In such a case, as the indexing mechanism follows the rotation of the cam, the associated feed finger contacts the face of a saw blade tooth and slides along the face profile, rather than remaining in a substantially constant location, as it advances the saw blade. As described above, this can lead to overgrinding of each tooth.

By contrast to conventional indexing mechanisms, embodiments of the present innovation relate to a circular saw blade indexing assembly configured to advance each tooth of a circular saw blade to substantially the same location relative to the grinding mechanism. In one arrangement, the circular saw blade indexing assembly includes a circular saw blade mounting assembly configured to support a circular saw blade, an indexing mechanism, and a radius adjustment mechanism. The radius adjustment is configured to adjust a relative longitudinal (i.e., radial) position between a saw hub of the circular saw blade mounting assembly and a feed finger of the indexing mechanism. With such a configuration, the rotation of the indexing mechanism is relative to the center of a saw blade carried by the circular saw blade mounting assembly such that the feed finger travels along an arc length defined by a circular saw blade to be profiled. In use, when a feed finger of the indexing mechanism contacts a tooth of a saw blade, as the indexing mechanism rotates the saw blade, the feed finger remains in substantially the same location relative to the tooth. Accordingly, the indexing mechanism advances each tooth of the saw blade at a substantially consistent velocity and positions each tooth in substantially the same location relative to the grinding mechanism to minimize overgrinding of the saw blade.

In one arrangement, a circular saw blade indexing assembly includes a circular saw blade indexing assembly that includes a base, a circular saw blade mounting assembly connected to the base and having a saw hub configured to support a circular saw blade, an indexing mechanism connected to the base and having a feed finger disposed at a radial distance from the saw hub, the feed finger configured to rotate the circular saw blade about the saw hub between a first arc position and a second arc position, and a radius adjustment mechanism configured to adjust a relative longitudinal position between the saw hub of the circular saw blade mounting assembly and the feed finger of the indexing mechanism.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

FIG. 10 illustrates arc profiles of a first and second circular saw blade and the offset there between.

DETAILED DESCRIPTION

Embodiments of the present innovation relate to a circular saw blade indexing assembly configured to advance each tooth of a circular saw blade to substantially the same location relative to the grinding mechanism. In one arrangement, the circular saw blade indexing assembly includes a circular saw blade mounting assembly configured to support a circular saw blade, an indexing mechanism, and a radius adjustment mechanism. The radius adjustment is configured to adjust a relative longitudinal (i.e., radial) position between a saw hub of the circular saw blade mounting assembly and a feed finger of the indexing mechanism. With such a configuration, the rotation of the indexing mechanism is relative to the center of a saw blade carried by the circular saw blade mounting assembly such that the feed finger travels along an arc length defined by a circular saw blade to be profiled. In use, when a feed finger of the indexing mechanism contacts a tooth of a saw blade, as the indexing mechanism rotates the saw blade, the feed finger remains in substantially the same location relative to the tooth. Accordingly, the indexing mechanism advances each tooth of the saw blade at a substantially consistent velocity and positions each tooth in substantially the same location relative to the grinding mechanism to minimize overgrinding of the saw blade.

Figure 1:
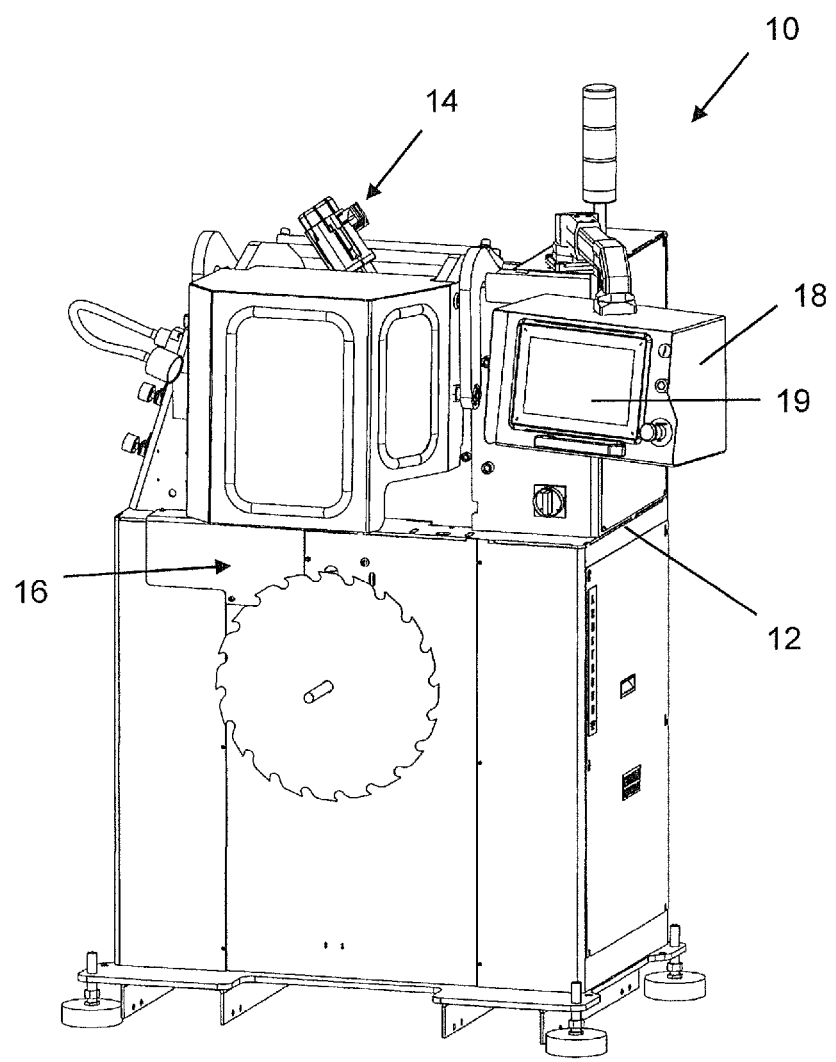
FIG. 1 illustrates a grinding system having a circular saw blade indexing assembly, according to one arrangement.

FIG. 1 illustrates a grinding system 10, according to one arrangement. The grinding system 10 includes a housing or frame 12 which carries a grinding apparatus 14 and a circular saw blade indexing assembly 16. The circular saw blade indexing assembly 16 is configured to advance each tooth of a circular saw blade toward the grinding apparatus 14. The grinding apparatus 14, such as motor driven wheel or disc made of a composite material, including diamond chips, is configured to grind a particular profile into each tooth of a circular saw blade. In one arrangement, the grinding system 10 includes a controller 18, such as a memory and processor, configured to control the feed rate of the circular saw blade indexing assembly 16 and the motion of the grinding apparatus 14 relative to each tooth to set a particular tooth profile geometry for each tooth of the circular saw blade.

In order to maintain consistent profiling of each tooth, the circular saw blade indexing assembly 16 is configured to advance each tooth of the circular saw blade to a substantially consistent location relative to the grinding apparatus 14. An arrangement of the circular saw blade indexing assembly 16 is described in detail below.

FIGS. 2A-2C and 3 illustrate front and rear perspective views of the circular saw blade indexing assembly 16, respectively. For clarity, the grinding apparatus 14 and other details of the grinding system 10 are not shown. With reference to both FIGS. 2A-2C and FIG. 3, the circular saw blade indexing assembly 16 includes a circular saw blade mounting assembly 20 and an indexing mechanism 21.

The circular saw blade mounting assembly 20 is configured to secure a circular saw blade to the grinding system 10. For example, with particular reference to FIG. 2A, the circular saw blade mounting assembly 20 includes a base 22 and an elongate shaft or saw hub 24 mounted to the base 22. The base 22 is coupled to a frame 12, such as the frame of the grinding apparatus 14 and is configured to dispose the shaft 24, and a longitudinal axis 40 of the base 22, at a radial distance 25 from a feed finger 30 of the indexing mechanism 21. For example, the base 22 can be coupled to a set of rails 28 of the grinding system 10 via a set of rollers 26. As will be described in detail below, interaction between the rollers 26 and the set rails 28 allows a user to adjust the position of the shaft 24 relative to the indexing mechanism 21.

Figure 2A:
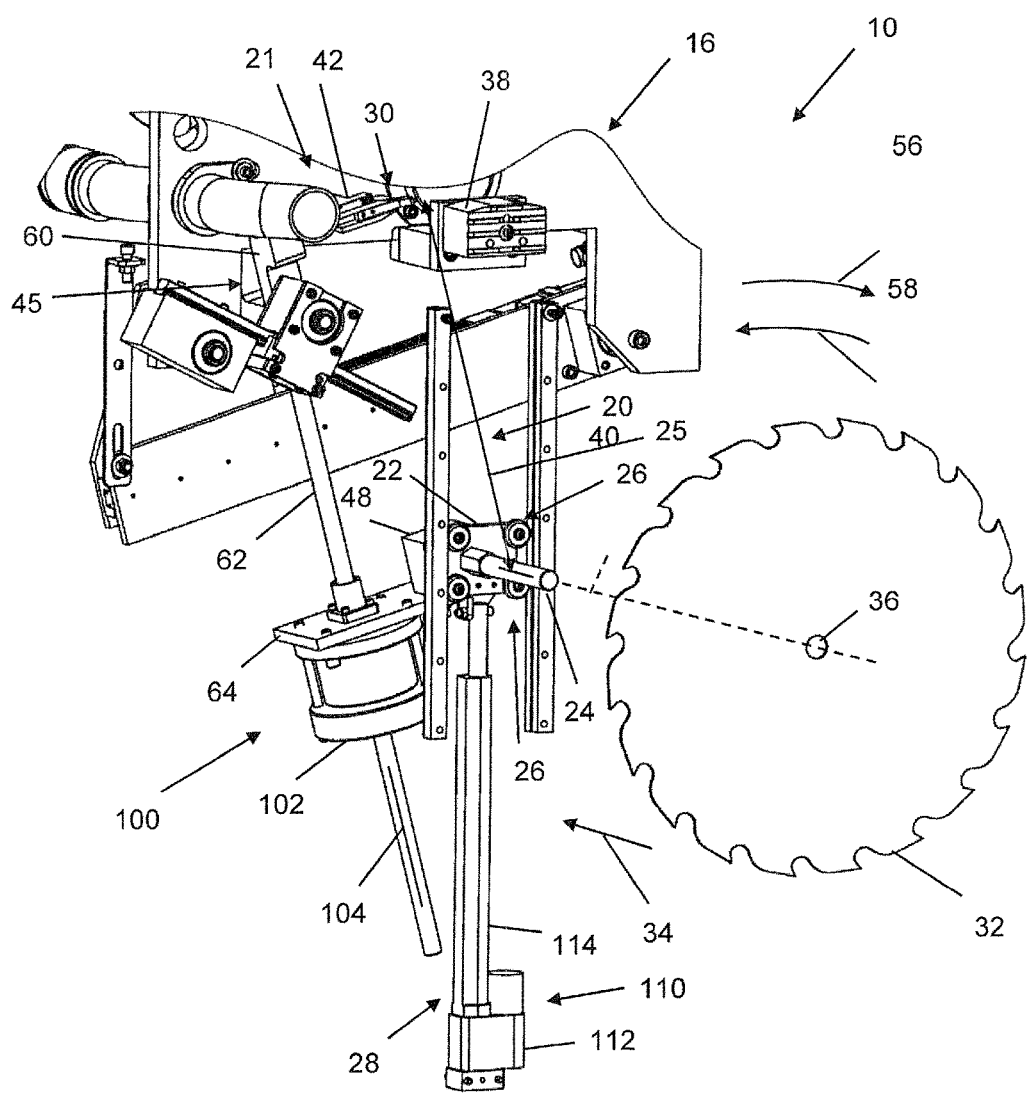
FIG. 2A illustrates a first front perspective view of the circular saw blade indexing assembly of FIG. 1, according to one arrangement.
Figure 2B:
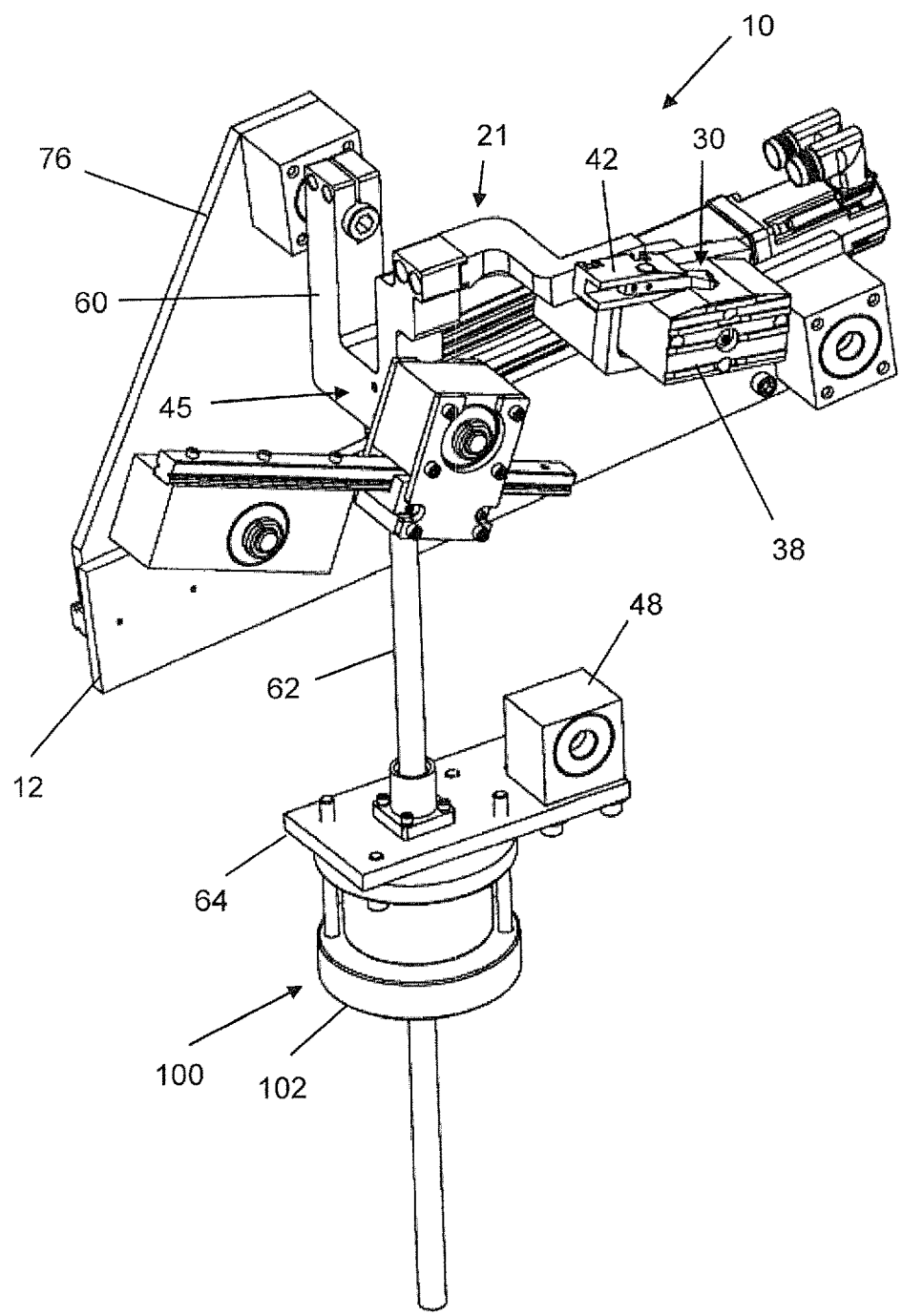
FIG. 2B illustrates a second front perspective view of the circular saw blade indexing assembly of FIG. 1, according to one arrangement.
Figure 2C:
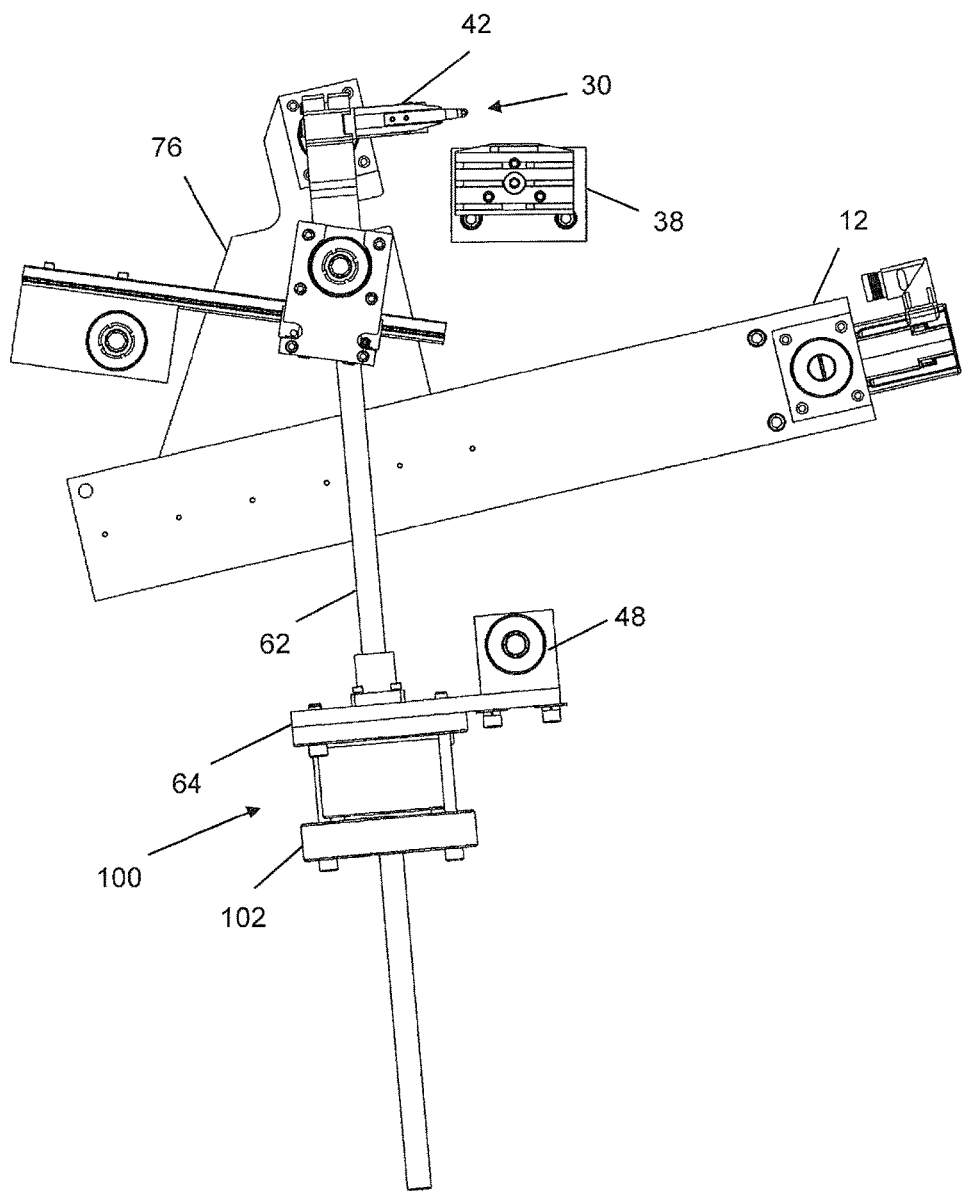
FIG. 2C illustrates a front view of the circular saw blade indexing assembly of FIG. 1, according to one arrangement.

The shaft 24 is configured to support a circular saw blade 32, as schematically indicated in phantom in FIG. 2A. For example, an operator can dispose the saw blade 32 onto the shaft 24 along direction 34 such that an opening 36 defined by the saw blade 32 extends about a circumference of the shaft 24 and a face of the saw blade 32 is disposed against baseplate 38. With such positioning, the center of the saw blade 32 is substantially collinear with a longitudinal axis 40 of the circular saw blade mounting assembly 20. Once in position, the operator can secure the saw blade 32 to the shaft 24 such that, in use, the shaft 24 and the saw blade 32 rotate relative to the base 22 and about the longitudinal axis 40 defined by the mounting assembly 20.

The indexing mechanism 21 is rotatably coupled to the circular saw blade mounting assembly 20 and is configured to rotate, and substantially track the rotational arc of, the circular saw blade 32 during operation. For example, with particular reference to FIG. 2A, the indexing mechanism 21 includes a housing 42 that carries the feed finger 30, a coupling mechanism 45, and an indexing mechanism bearing 48 rotatably coupled to the base 22 of the circular saw blade mounting assembly 20.

Figure 4A:
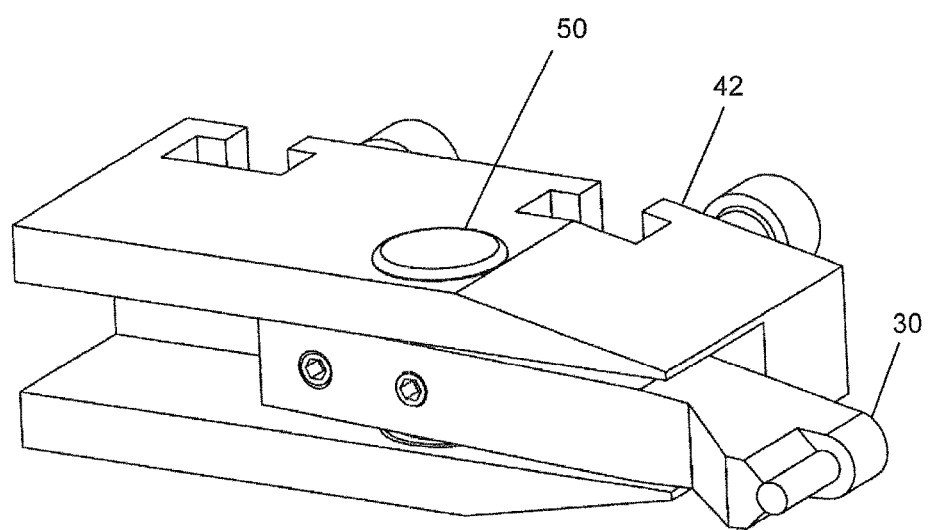
FIG. 4A illustrates a perspective view of an indexing mechanism of the circular saw blade indexing assembly of FIG. 1, according to one arrangement.
Figure 4B:
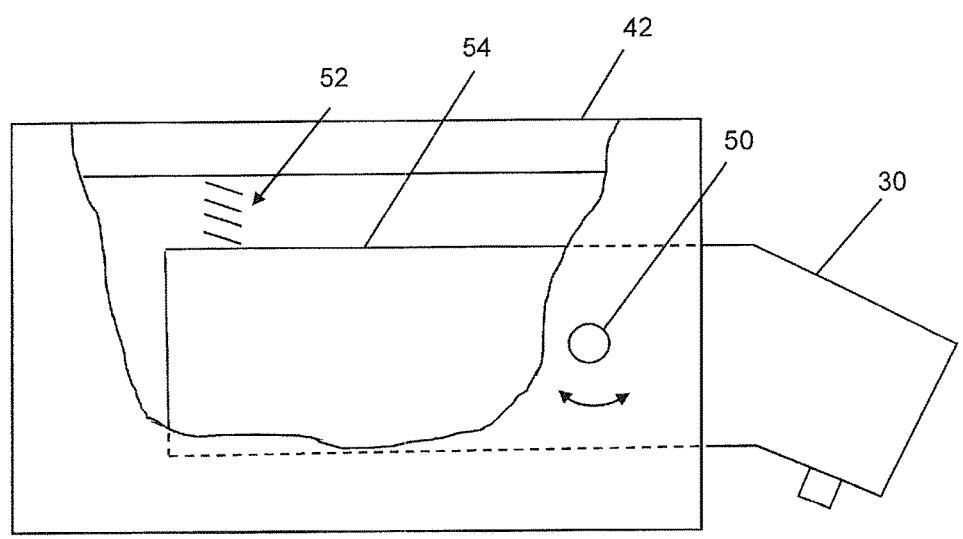
FIG. 4B illustrates a schematic top, partial cutaway view of a housing of the indexing mechanism of FIG. 4A, according to one arrangement.

The feed finger 30 is configured to contact a portion of each tooth of the circular saw blade 32 to advance each tooth toward the grinding apparatus 14 of the grinding system 10. For example, as will be described below, the feed finger 30 can contact a face portion of each tooth of the saw blade while rotating the saw blade 32. In such an arrangement, to limit the wear of the feed finger 30 over time, the feed finger 30 can be manufactured from a relatively high-strength, wear-resistant material, such as a carbide material. In one arrangement, the feed finger 30 is pivotably coupled to the housing 42. For example, with reference to FIGS. 4A and 4B, the housing 42 includes a pin 50 extending between opposing walls of the housing 42 and through a length of the feed finger 30. The housing 42 further includes a spring 52 coupled between a wall of the housing 42 and to a side 54 of the feed finger 30. The spring 52 is configured to bias the rotational position of the feed finger 30 toward a face of the circular saw blade 32 and allows the feed finger 30 to pivot within housing 42 when the feed finger 30 moves across the face of the saw blade 32.

For example, with additional reference to FIG. 2A, in the case where the indexing mechanism 21 is configured to rotate the feed finger 30 along a clockwise direction 56, the spring 52 biases the feed finger 30 about pin 50 and into contact with a tooth of the saw blade 32, such as into contact with the face portion of a tooth. In the case where the indexing mechanism 21 is configured to retract along a counter clockwise direction 58, the feed finger 30 contacts a face portion of the saw blade 32 which causes feed finger 30 to overcome the biasing force generated by the spring 52 and to pivot about the pin 50 and away from the tooth of the saw blade 32.

The coupling mechanism 45 disposes the feed finger 30 at a radial distance 25 from the longitudinal axis 40 of the circular saw blade mounting assembly 20. While the coupling mechanism 45 can be configured in a variety of ways, in one arrangement, the coupling mechanism 45 includes a bracket element 60 coupled to the housing 42, a support 62 coupled to the bracket element 60, and a support plate 64 coupled between the support 62 and the indexing mechanism bearing 48. The coupling mechanism 45 is configured to set the radial distance 25 such that the radial distance 25 substantially corresponds (e.g., is substantially equal) to a radius of the saw blade 32 supported by the shaft 24.

As indicated above, the coupling mechanism 45 secures the housing 42 of the indexing mechanism 21 to the indexing mechanism bearing 48. The indexing mechanism bearing 48 is rotatably coupled to the base 22 and is configured to rotate about the longitudinal axis 40 of the base 22. Accordingly, the coupling mechanism 45 and the indexing mechanism bearing 48 ties the rotation of the feed finger 30 to the longitudinal axis 40 of the base 22 and, as will be described below, to the rotational arc of a saw blade 32 mounted to the shaft 24.

Rotation of the indexing mechanism 21 can be controlled in a variety of ways. In one arrangement, with reference to FIG. 3, the circular saw blade mounting assembly 20 includes an actuator 70, such as a linear actuator element 71 and motor 73, having a first end 72 coupled to a frame 12 of the grinding system 10 and a second end 74 coupled to the indexing mechanism 21. For example, as illustrated, the second end 74 of the actuator 70 is coupled to a first end 75 of a support element 76, such as a plate, and a second end 77 of the support element 76 is mounted to the bracket 60. The support element 76 is slidably coupled to a rail 78 associated with the frame 12. In use, as the motor 72 of the actuator 70 translates the linear actuator element 71 along path 80, the linear actuator element 71 causes the support element 76 to translate along the rail 78 relative to the frame 12. Translation of the support element 76 causes the indexing mechanism 21 to rotate within an arc (i.e., between first and second arc positions) about the longitudinal axis 40 of the base 22.

Figure 5:
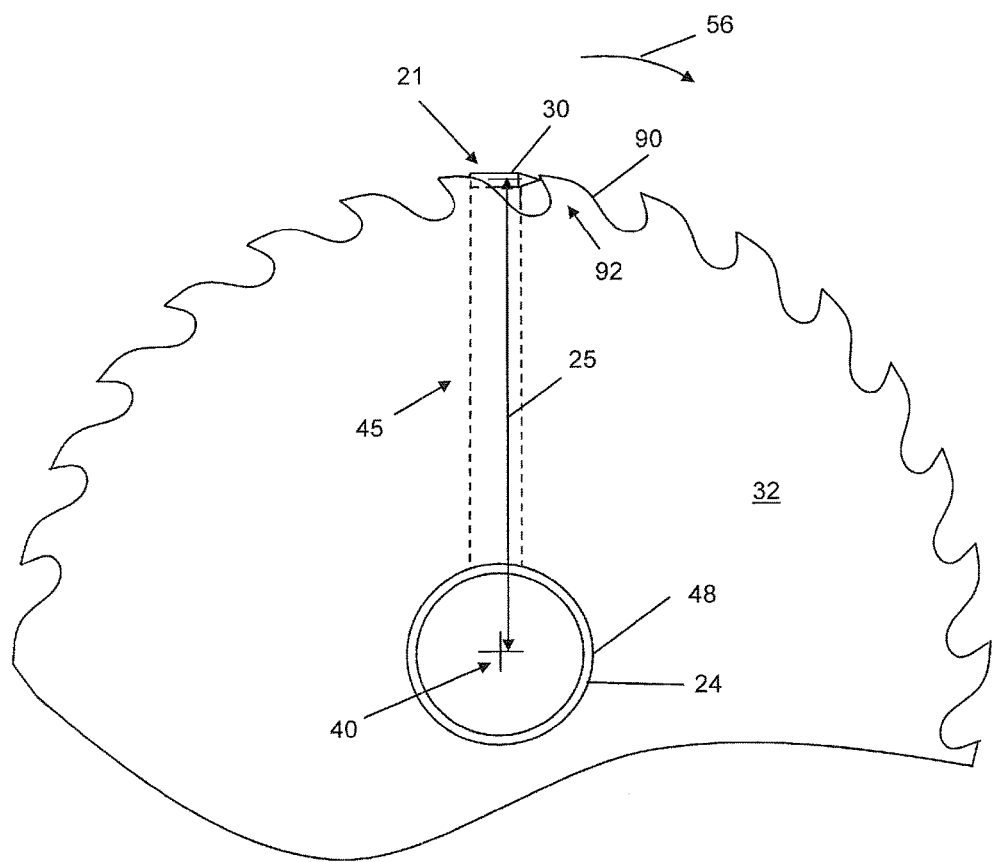
FIG. 5 illustrates a schematic representation of the positioning of a feed finger of the circular saw blade indexing mechanism relative to a saw blade in a first arc position, according to one arrangement.
Figure 6:
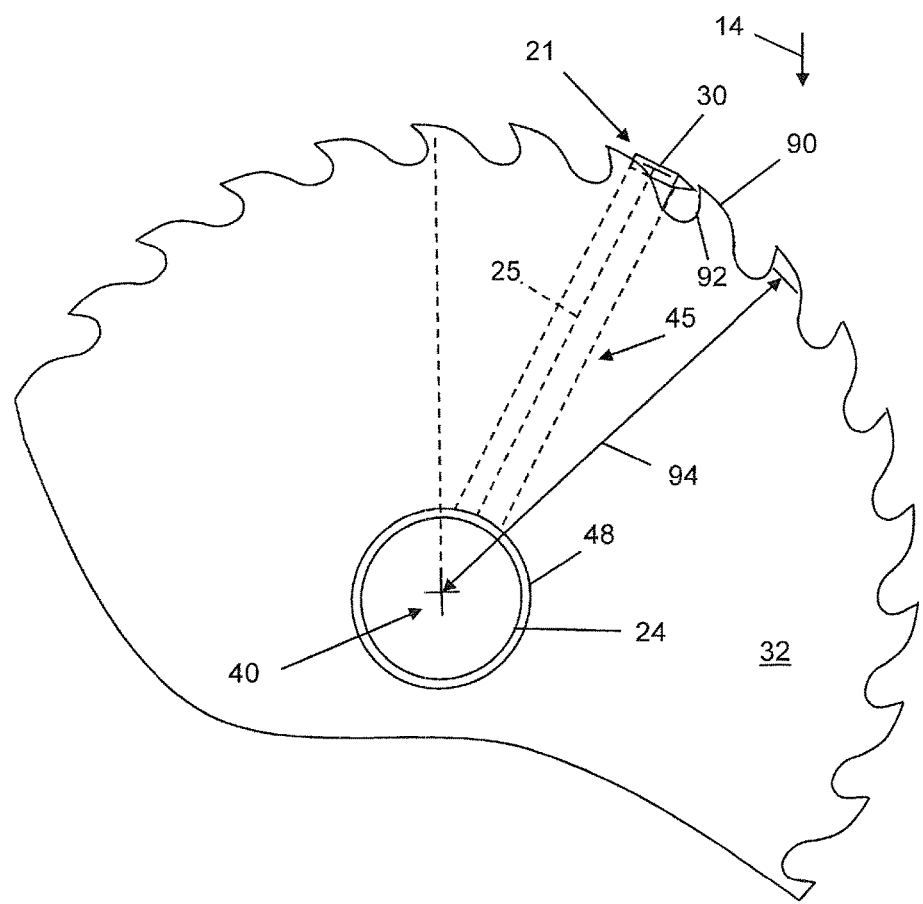
FIG. 6 illustrates a illustrates a schematic representation of the positioning of a feed finger of the circular saw blade indexing mechanism relative to a saw blade in a second arc position, according to one arrangement.

As indicated above, the circular saw blade indexing assembly 16 is configured to advance each tooth of the circular saw blade 36 to a substantially consistent location relative to a grinding apparatus 14 in order to maintain consistent tooth-to-tooth profiling. Operation of the circular saw blade indexing assembly 16 is illustrated in FIGS. 1, 5, and 6.

In use, an operator places and secures a circular saw blade 32 onto the shaft 24 of the circular saw blade mounting assembly 20 and positions the saw blade 32 such that the center of the shaft 24 is disposed at a radial distance 25 from the feed finger 30. As indicated in FIG. 5, the feed finger 30 then contacts a tooth 90 at location 92, such as a location within a tooth face. As the actuator 70 rotates the indexing mechanism 21 along direction 56, the indexing mechanism bearing 48 rotates about the longitudinal axis 40 of the base 22 to dispose the feed finger 30 and tooth 90 from a first arc position, shown in FIG. 5, to a second arc position, shown in FIG. 6. Because the radial position of the feed finger 30 is substantially equal to the radius of the saw blade 32, the feed finger 30 remains in substantially the same location on the tooth 90 during this rotation. By substantially maintaining the positioning of the feed finger 30 on the tooth 90 at location 92 during rotation, the indexing mechanism 21 rotates each tooth of the saw blade 32 at a substantially constant, relative velocity toward a grinding apparatus 14. This allows the grinding apparatus 14 to create a consistent sharpened profile from tooth to tooth and minimizes over-grinding of the saw blade 32.

As indicated above, the radial distance 25 between the feed finger 30 of the indexing mechanism 21 and the longitudinal axis 40 corresponds to a radius 94 of a saw blade 32 supported by the shaft 24. However, circular saw blades 32 are typically manufactured having a variety of radii. In order to accommodate saw blades 32 having a variety of radii, in one arrangement as illustrated in FIGS. 2A-2C and 3, the circular saw blade indexing assembly 16 includes a radius adjustment mechanism 100. For example, with reference to FIGS. 2A-2C, the radius adjustment mechanism 100 is coupled between the indexing mechanism 21 and the circular saw blade mounting assembly 20. The radius adjustment mechanism 100 is configured to adjust the radial position 25 of the shaft 24 of the circular saw blade mounting assembly 20 relative to the feed finger 30 of the indexing mechanism 21 to dispose the teeth of the saw blade 32 in proximity to the feed finger 30 and to maintain the center of the saw blade 32 at a substantially set distance relative to the feed finger 30.

The radius adjustment mechanism 100 can be configured in a variety of ways. In one arrangement, the radius adjustment mechanism 100 includes the support 62 of the coupling mechanism 45 and a collar 102 selectively coupled to the support 62 and secured to the circular saw blade mounting assembly 20. For example, with reference to FIGS. 2A-2C, the collar 102 is selectively coupled to the support 62 via a mechanical or magnetic lock and is secured to the indexing mechanism bearing 48 via plate 64. When decoupled from the support 62, the collar 102 is configured to translate along a longitudinal axis 104 of the support 62 to position the base 22 and shaft 24, and the saw blade 32, relative to the feed finger 30 of the indexing mechanism 21. When the operator has positioned the teeth of the saw blade 32 in proximity to the feed finger 30, the operator couples the collar 102 to the support 62, such as by using the lock mechanism. As indicated in FIGS. 2A-2C and 3, because the support 62 forms part of the actuating mechanism 21, during operation the radius adjustment mechanism 100 rotates relative to the base 22 along first and second arc directions.

The positioning of the radius adjustment mechanism 100 can be controlled in a variety of ways. In one arrangement, the radius adjustment mechanism 100 includes a positioning actuator 110 configured to control the positioning of the shaft 24 relative to the feed finger 30. For example, the positioning actuator 110 includes a housing 112 which can be secured to the frame 12 of the grinding system 10, and an arm 114, such as a motor driven arm, coupled to the collar 102 via plate 64.

When adjusting the radial distance 25 between the feed finger 30 and the shaft 24 to set radius of the saw blade 32 relative to feed finger 30, an operator first drives the actuator 70 to position the feed finger housing 42 to a docking position to minimize motion of the feed finger 30. Next, the operator disengages the collar 102 from the support 63 which allows collar 102 to translate along longitudinal axis 104 of the support 62. Next, the operator activates the positioning actuator 110 coupled to saw blade mounting assembly 20 to adjust radial distance 25 between the center position of a saw blade carried by the shaft 24 and the feed finger 30. As the actuator 110 translates the saw blade mounting assembly 20, the rollers 26 of the base 22 rotate relative to the rails 28 and the collar 102 translates relative to the support 62. Such translation allows the operator to adjust the position of the shaft 24 relative to the indexing mechanism 21 until the teeth of the saw blade 32 is disposed in proximity to the feed finger 30 (e.g., such that a tip of the feed finger 30 is disposed within a face location defined by a saw blade tooth). Once in this position, the operator can secure the collar 102 to the support 62, such as by using a locking mechanism, and can drive the actuator 70 to dedock the feed finger housing 42 from the docking position.

During use, as a manufacturer sharpens a saw blade 32 multiple times, the diameter of the saw blade 32 can shrink. For example, a circular saw blade having a 24 inch diameter with a two inch tooth spacing can shrink to a 22 inch diameter having a 1.95 inch tooth spacing after multiple sharpening procedures. However, in conventional grinding systems, as the saw diameter shrink, the grinder can continue to profile each of the teeth on a circular saw blade based upon the original 24 inch diameter of the saw blade and two inch tooth spacing.

Figure 3:
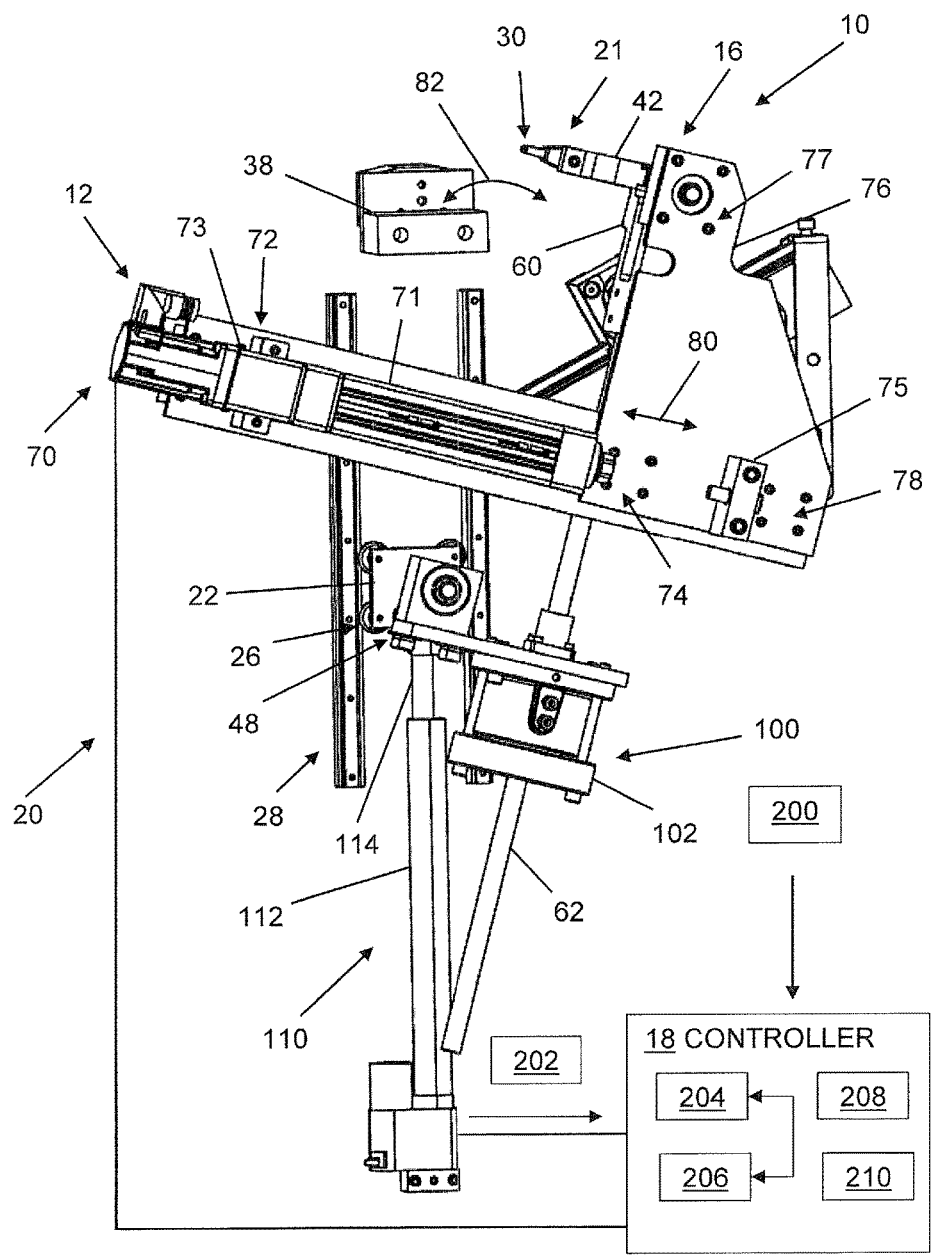
FIG. 3 illustrates a rear perspective view of the circular saw blade indexing assembly of FIG. 1, according to one arrangement.

In one arrangement, the grinding system 10 is configured to track the change in size for a given saw blade 32 and to adjust the grinding process according to the change in saw blade size. For example, as illustrated in FIG. 3, the grinding system 10 includes the controller 18, such as a processor and a memory, disposed in electrical communication with the circular saw blade mounting assembly 20 and with the indexing mechanism 21.

During operation, the controller 18 is configured to receive a blade diameter value 200 associated with a circular saw blade 32 supported by the circular saw blade mounting assembly 20 where the value 200 is equal to the initial diameter of the saw blade 32. For example, with reference to FIG. 1, an operator can enter the diameter of the circular saw blade 32 on a keypad or touchpad 19 associated with the controller 18.

Returning to FIG. 3, the controller 18 is configured to detect an actual diameter of the circular saw blade 32 from the circular saw blade mounting assembly 20. For example as the operator adjusts the position of the shaft 24 relative to the feed finger 30 using the positioning actuator 110, the positioning actuator 110 provides a positioning signal 202 to the controller 18 which indicates the radial distance 25 between the center of the saw blade 32 (i.e., the longitudinal axis 40 of the assembly 20) and the feed finger 30. The controller 18 is then configured to apply a calibration factor to the positioning signal 202 to determine the actual diameter value 204 of the saw blade 32.

The controller 18 is then configured to compare the actual blade diameter value 204 with a blade diameter threshold value 206. For example, the controller 18 can be preconfigured with a set of blade diameter threshold values and can select a particular blade diameter threshold value 206 from the set based upon the blade diameter value 200 received by the controller 18. For example, in the case where the controller 18 receives a blade diameter value 200 indicating the saw blade 32 is a 24 inch diameter blade, the controller 18 can select the blade diameter threshold value 206 that corresponds to the 24 inch diameter of the saw bade 32.

In the comparison, when the controller 18 detects that the actual blade diameter value 204 exceeds the blade diameter threshold value 206, the controller 18 maintains a set of grinding criteria 208 applied to the circular saw blade 32 based upon the received blade diameter value 200 of the circular saw blade. For example, assume the case where the actual blade diameter value 204 is 23.7 inches and the blade diameter threshold value 206 is 23.5 inches. In this case, because the actual blade diameter value 204 is greater than the blade diameter threshold value 206, the controller 18 is configured to maintain certain grinding criteria 208, such as the indexing speed of the actuator 70 associated with the indexing mechanism 21, the rotational and actuation speed associated with the grinding apparatus 14, and the tooth profile geometry generated by the grinding apparatus 14. However in the case when the actual blade diameter value 204 falls below the blade diameter threshold value 206, the controller 18 is configured to adjust the set of grinding criteria 210 based upon the actual blade diameter value 204 of the circular saw blade 32. For example, assume the case where the actual blade diameter value 204 is 23.2 inches and the blade diameter threshold value 206 is 23.5 inches. In this case, because the actual blade diameter value 204 is less than the blade diameter threshold value 206, the controller 18 is configured to adjust the set of grinding criteria 210, such as the indexing speed of the actuator 70 associated with the indexing mechanism 21, the rotational and actuation speed associated with the grinding apparatus 14, and the tooth profile geometry generated by the grinding apparatus 14, to correspond to a smaller diameter saw blade. This allows the grinding system 10 to minimize overgrinding of the saw blade 32 as its diameter decreases over time to provide accurate grinding and sharpening of the saw blade 32.

With respect to the grinding system 10, in order to accommodate saw blades 32 having a variety of radii, the circular saw blade indexing assembly 16 includes a radius adjustment mechanism 100. As provided above, the radius adjustment mechanism 100 is configured to adjust the radial position 25 of the saw hub 24 of the circular saw blade mounting assembly 20 relative to the feed finger 30 of the indexing mechanism 21 to dispose the teeth of the saw blade 32 in proximity to the feed finger 30 and to maintain the center of the saw blade 32 at a substantially set distance relative to the feed finger 30. In one arrangement, with reference to FIGS. 7-9, the radius adjustment mechanism 100 is configured to adjust a relative longitudinal (i.e., radial) position between the saw hub 24 of the circular saw blade mounting assembly 20 and the feed finger 30 of the indexing mechanism 21.

Figure 7:
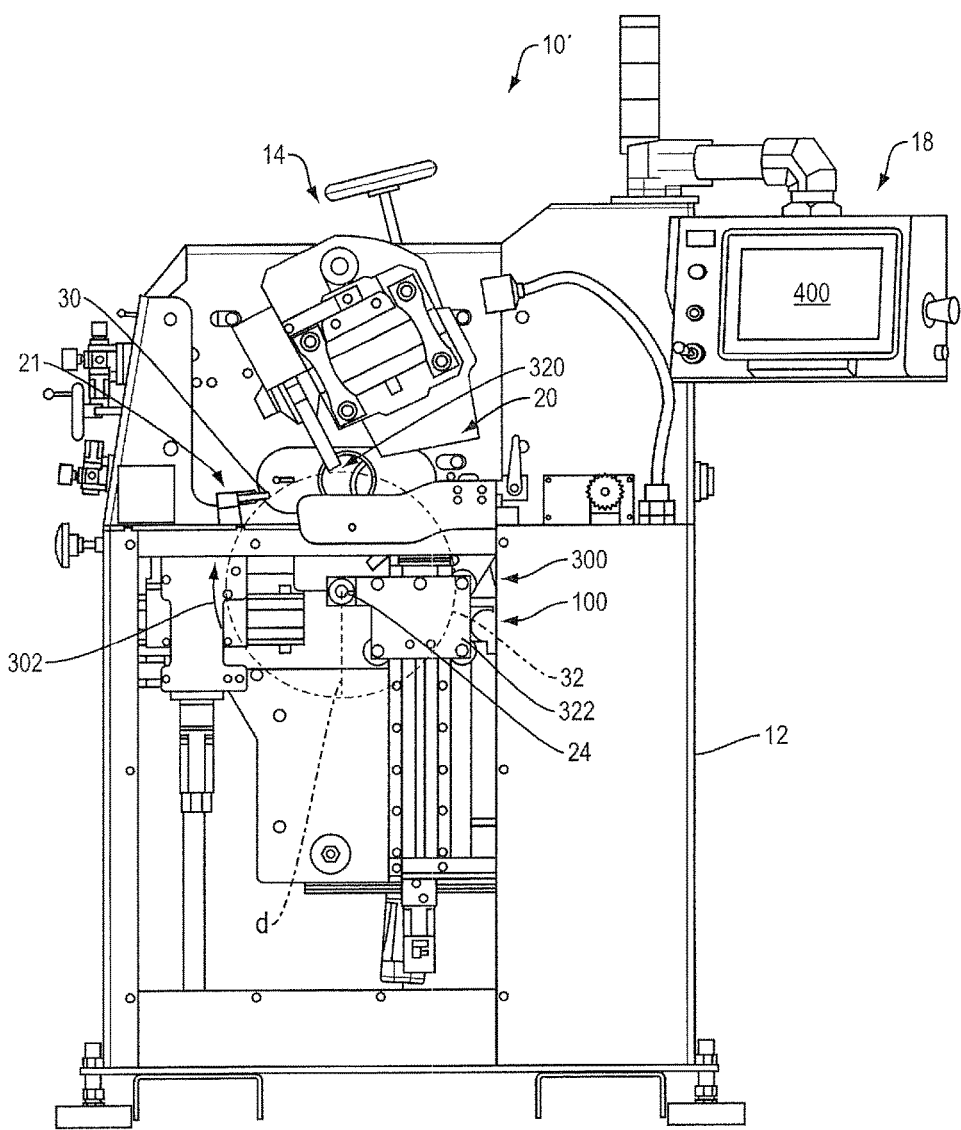
FIG. 7 illustrates a grinding system having a radius adjustment mechanism, according to one arrangement.

FIG. 7 illustrates an arrangement of a grinding system 10' having a circular saw blade indexing assembly 300. The grinding system 10' includes a circular saw blade mounting assembly 20, an indexing mechanism 21, and the radius adjustment mechanism 100.

Figure 8:
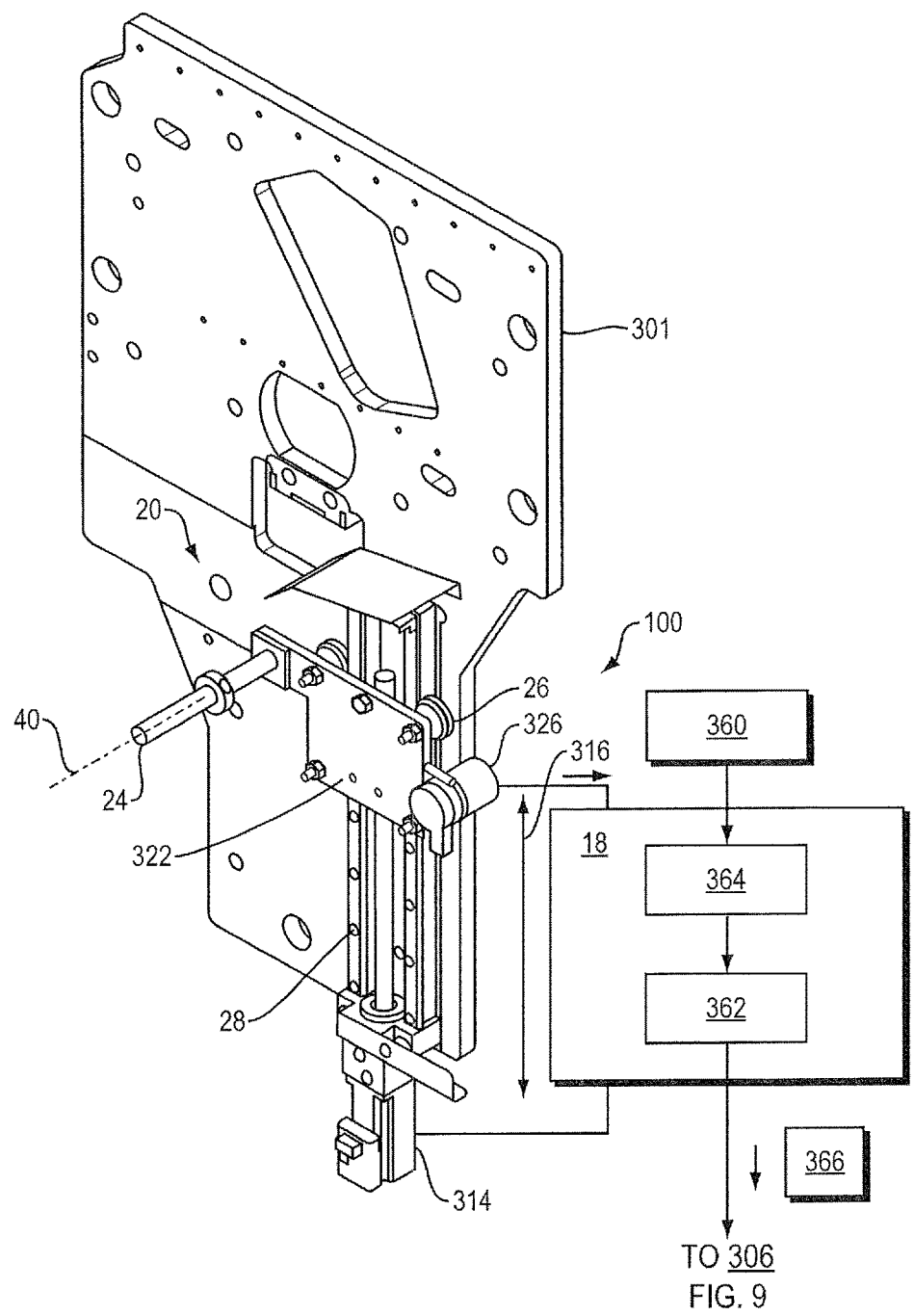
FIG. 8 illustrates a circular saw blade mounting assembly of the grinding system, according to one arrangement.

With additional reference to FIG. 8, the circular saw blade mounting assembly 20 includes a saw hub 24 configured to support a circular saw blade 32 and a saw hub base 322. For example, in use, the circular saw blade 32 is configured to rotate about the saw hub 24 relative to the longitudinal axis 40. As indicated in FIG. 8, the saw hub base 322 connects the circular saw blade mounting assembly 20 to a base 301 which, in turn, connects the circular saw blade mounting assembly 20 and the indexing mechanism 21 (FIG. 9) to the frame 12 of the grinding system 10'.

With reference to FIG. 7, the indexing mechanism 21 includes a feed finger 30 disposed at a radial distance d from the saw hub 24 (e.g., at a distance d from the longitudinal axis 40 of the saw hub 24). As provided above, the feed finger 30 is configured to index the circular saw blade 32 about the saw hub 24 relative to the grinding apparatus 14.

For example, the feed finger 30 is configured to rotate the circular saw blade 32 in one direction of travel 302 (i.e., clockwise) relative to the grinding apparatus 14.

Figure 9:
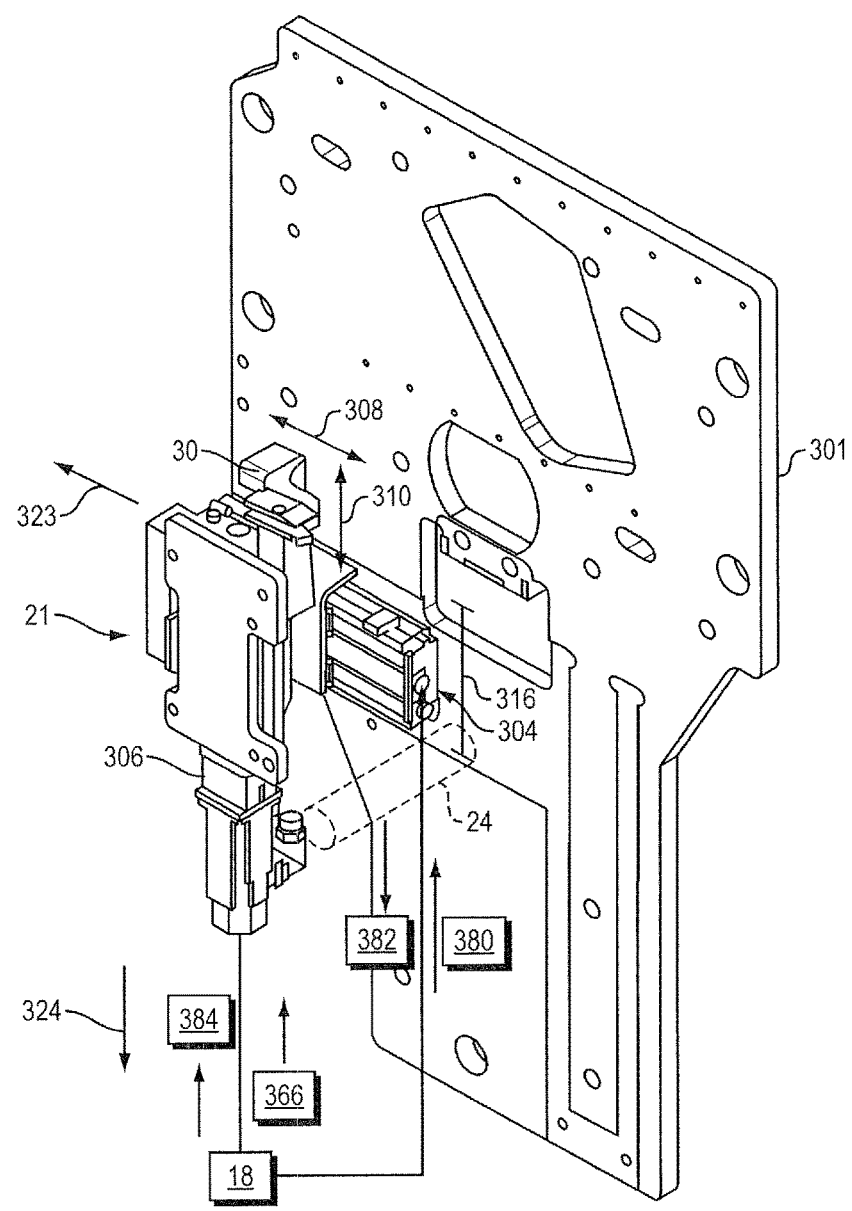
FIG. 9 illustrates an indexing mechanism of the grinding system, according to one arrangement.

With reference to FIG. 9, in one arrangement, the indexing mechanism 21 includes a set of linear actuators that are configured to position the feed finger 30 relative to the grinding apparatus 14. For example, as shown, the indexing mechanism 21 includes a first linear actuator 304 and a second linear actuator 306 dispose substantially perpendicular to the first linear actuator 304. The first linear actuator 304 is configured to adjust a lateral or horizontal position 308 of the feed finger 30 relative to the base 300 and operates as a master actuator relative to the second linear actuator 306. The second linear actuator 306 is configured to adjust a longitudinal or vertical position 310 of the feed finger 30 relative to the base 300 and operates as a slave actuator relative to the first linear actuator 304.

During conventional operation, the first linear actuator 304 and the second linear actuator 306 are electrically linked to each other. While the first and second actuators 304, 306 can be electrically linked in a variety of ways, in one arrangement, each of the first and second linear actuators 304, 306 are electrically linked by the controller 18. With such linking, the second linear actuator 306 is configured to operate in conjunction with (i.e., as a slave to) the first linear actuator 306 to position the feed finger 30 along an arc defined by the longitudinal position of the saw hub 24. Accordingly, in use, as the first linear actuator 304 moves the feed finger 30 along a lateral position 308, the second linear actuator 306 automatically moves the feed finger 30 along a longitudinal position 310. The motion of the first and second linear actuators 304, 306 locates the feed finger 30 along an arc-shape defined by the position of the saw hub 24 relative to the feed finger 30.

The radius adjustment mechanism 100 of the grinding system 10' is configured to adjust a relative longitudinal position 316 between the saw hub 24 of the circular saw blade mounting assembly 20 and the feed finger 30 of the indexing mechanism 21, as indicated in FIG. 9.

While the radius adjustment mechanism 100 can be configured in a variety of ways, in one arrangement, with reference to FIG. 8, the radius adjustment mechanism 100 includes a set of rails 28 mounted to the base 301 of the circular saw blade indexing assembly 300. The saw hub base 322 of the circular saw blade mounting assembly 20 is connected to the set of rails 28 via a set of rollers 26. The radius adjustment mechanism 100 further includes a positioning actuator 314, such as a stepper motor, connected to the saw hub 24 via the saw hub base 322 and disposed in electrical communication with the controller 18. The positioning actuator 314 is configured to adjust the longitudinal or vertical position 316 of the saw hub 24 relative to the feed finger 30 such as in response to a control signal provided by the controller 18. For example, as the positioning actuator 314 translates the saw hub 24, the rollers 26 of the base 22 rotate relative to the rails 28 and the saw hub 24 and saw hub base 322 translate relative to the base 301.

In one arrangement, the positioning actuator 314 includes a linear measurement device 326, such as a linear potentiometer, disposed in electrical communication with the controller 18. During operation, the linear measurement device 326 is configured to transmit a position signal to the controller 18 which identifies the relative longitudinal position 310 of the saw hub 24.

By adjusting the relative position of the saw hub 24 and the feed finger 30, the radius adjustment mechanism 100 allows the grinding system 10' to re-profile circular saw blades 32 having differently sized radii. Specifically, the radius adjustment mechanism 100 adjusts the relative positioning 316 between the saw hub 24 and the feed finger 30 to allow the feed finger 30 to contact a tooth of a saw blade 32 and, as the indexing mechanism 21 rotates the saw blade 32, maintain the feed finger 30 in substantially the same location relative to the saw blade tooth. Accordingly, the indexing mechanism 21 can advance each tooth of the saw blade 32 at a substantially consistent velocity and position each tooth in substantially the same location relative to the grinding mechanism 14 to minimize overgrinding of the saw blade 32.

To provide such positioning of the feed finger 30, the indexing mechanism 21 and positioning actuator 314 of the radius adjustment mechanism 100 are first calibrated.

For example, when an operator starts the grinding system 10' for the first time, the operator calibrates the saw hub 24 position in relation to a radial distance d from a top-dead-center position (TDC) 320. In one arrangement, with reference to FIG. 7, the operator first adjusts the position of the saw hub 24, using the positioning actuator 314, to a first known distance (i.e., radial distance d=eight inches) from the TDC position 320.

Based on this position, the linear measurement device 326 provides a first calibration signal to the controller 18 (i.e., first calibration signal=2V). The operator then adjusts the position of the saw hub 24, using the positioning actuator 314, to a second known distance (i.e., radial distance d=16 inches) from the TDC position 320. Based on this position, the linear measurement device 326 provides a second calibration signal to the controller 18 (i.e., second calibration signal=8V). Based upon the first and second known radial distances and the first and second calibration signal values, the controller 18 can generate and store a calibration curve which relates any position signal 360 received from the linear measurement device 326 to a radius of a circular saw blade 32. Accordingly, with the positioning actuator 314 calibrated, the controller 18 can identify the location of the saw hub 24 in space (i.e., along the longitudinal position 316).

Next, the operator calibrates the position of the feed finger 30 relative to the TDC position 320. With reference to FIG. 9, in one arrangement, each of the first and second linear actuators 304, 306 include a limit switch (not shown). As part of the calibration process, the controller 18 electrically de-links the first and second linear actuators 304, 306 such that each linear actuator 304, 306 is configured to operate independent from the other. The operator then homes the first linear actuator 304 along direction 323 and the second linear actuator 306 along distance 324 until each linear actuator 304, 306 reaches its respective limit switch. The controller 18 then sets the position of the first linear actuator 304 and the position of the second linear actuator 306 as home position (0.000", 0.000").

The operator then actuates the first linear actuator 304 and the second linear actuator 306 such that the feed finger 30 is disposed at the TDC position 320. The TDC position 320 is configured as a top vertical position relative to the center of the saw hub 24 (e.g., as a point or location (X, Y+d) of a circle radius (d) centered about a location (X,Y) of the saw blade hub 24) and is identified as the lateral and longitudinal distance of the feed finger 30 from the home position. The operator then stores this distance with the controller 18. The distance is used by the controller 18 when homing the feed finger 30 and identifies the TDC position 320, within space, to the controller 18. In one arrangement, a feed finger gauge identifies the correspondence between the feed finger's 30 physical location and the TDC position 320. For example, the arc position of the feed finger is about ³⁄₁₆" below the TDC position 320.

With such positioning, the controller 18 resets the first linear actuator 304 to a value of 0.000" and resets the second linear actuator 306 to a value corresponding to the radial distance d from the saw hub 24. The operator then electrically links the first and second actuators 304, 306 such that the second linear actuator 306 is configured to operate in conjunction with (i.e., as a slave to) the first linear actuator 306 to position the feed finger 30 along an arc defined by the longitudinal position of the saw hub 24. Accordingly, with the first and second linear actuators 304, 306 calibrated, the controller 18 can identify the location of the feed finger 30 in space (i.e., relative to the TDC position 320) at the start of a grinding procedure.

As indicated above, the operator can utilize the positioning actuator 314 to adjust the position of the saw hub 24 relative to the TDC position 320 to allow the grinding system 10' to grind or profile differently sized circular saw blades 32. However, as the operator adjusts the position of the saw hub 24, the arc-shape associated with the circular saw blade 32 changes and, by definition, the position of the feed finger 30 is no longer disposed on the correct arc.

Figure 10:
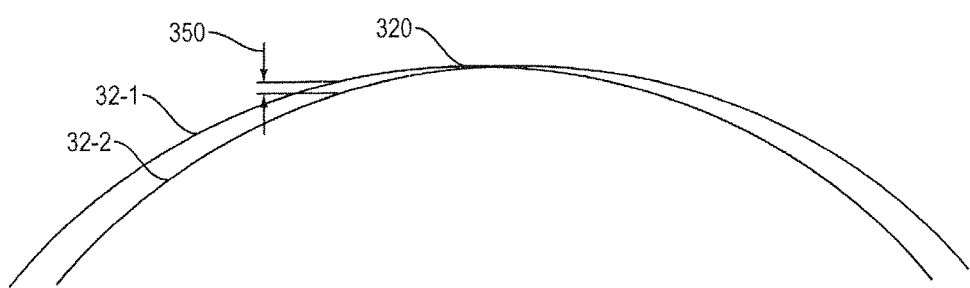

For example, with reference to FIG. 10, assume the case where the grinding system 10' is configured to grind a 24-inch diameter circular saw blade 32-1. With such a configuration, the feed finger 30 is limited to move in a 24-inch diameter arc. Next, assume the case where the operator places a 20-inch diameter circular saw blade 32-2 on the saw hub 24 and utilizes the positioning actuator 314 to adjust the position of the saw hub 24 relative to the TDC position 320. As illustrated, because the feed finger 30 is configured to move in a 24-inch diameter arc, the feed finger 30 is disposed at a location that is longitudinally out-of-position relative to the 20-inch diameter circular saw blade 32-2. For example, the feed finger 30 is disposed at an offset 350 of 0.1077 inches.

In order to adjust for this offset 350, the controller 18 is configured to operate as part of the radius adjustment mechanism 100 to adjust a longitudinal position 310 of the feed finger 30 to correspond with the radius of the circular saw blade 32.

In one arrangement, with reference to FIG. 8, the controller 18 is configured to receive a position signal 360 from the circular saw blade mounting assembly 20 where the position signal 360 identifies the longitudinal position 316 of the saw hub 24 relative to the base 301 and the TDC position 320. For example, assume the case above where the operator has placed a 20-inch diameter circular saw blade 32-2 on the saw hub 24 and has utilized the positioning actuator 314 to adjust the longitudinal position 316 of the saw hub 24 relative to the TDC position 320. As the positioning actuator 314 adjusts the longitudinal position 316 of the saw hub 24, such as via the controller 18, the linear measurement device 326 provides a corresponding position signal 360 to the controller 18. The position signal 360 can be configured as a voltage that corresponds to the longitudinal position 316 of the saw hub 24 relative to the TDC position 320.

Next, the controller 18 is configured to detect a radius 362 of the circular saw blade 32 based upon the position signal 360 operation of the controller 18. For example, as provided above, the controller 18 is configured with a calibration curve 364 which relates a position signal 360 received from the linear measurement device 326 to a radius of a circular saw blade 32. Based upon the position signal 360, the controller 18 utilizes the calibration curve 364 to identify the radius 362 corresponding to the position signal 360 (e.g., the voltage provided by the linear measurement device 326). For example, in the case where the operator has placed a 20-inch diameter circular saw blade 32-2 on the saw hub 24, the controller 18 can detect the circular saw blade 32-2 as having a ten-inch radius based upon the position signal 360 and the calibration curve 364.

The controller 18 is configured to then transmit a longitudinal position adjustment signal 366 to the indexing mechanism 21 to adjust a longitudinal position 316 of the feed finger 30 to correspond with the radius of the circular saw blade. For example, assume the case where the controller 18 is initially configured to grind a 24-inch diameter circular saw blade 32-1 (i.e., a 12-inch radius circular saw blade). When the controller 18 identifies the updated radius 362 of the circular saw blade 32-2 (i.e., a 10-inch radius) based upon the position signal 360 relative to the initial radius of the circular saw blade 32-1, the controller 18 is configured to detect the offset 350 between the arc diameters of the circular saw blade 32-1, 32-2 (i.e., 24-inch versus 20-inch). With such an offset 350, the feed finger 30 is longitudinally out-of-position relative to the 20-inch diameter circular saw blade 32-2. To correct for the offset 35, the longitudinal position adjustment signal 366 provided by the controller 18 adjusts the longitudinal position of the feed finger 30.

With reference to FIG. 9, prior to transmitting the longitudinal position adjustment signal 366 to the indexing mechanism 21, the controller 18 is configured to electrically delink the first linear actuator 304 from the second linear actuator 306. For example, as provided above, the first and second actuators 304, 306 are electrically linked together such that the second linear actuator 306 is configured to operate in conjunction with the first linear actuator 306 to position the feed finger 30. Electrically delinking the first and second actuators 304, 306 allows the second linear actuator 306 to operate and position the feed finger 30 independent from the first linear actuator 304.

While the controller 18 can electrically delink the first and second actuators 304, 306 in a variety of ways, in one arrangement, the controller 18 is configured to delink the linear actuators 304, 306 in memory to allow their independent operation. For example, as provided above, as the positioning actuator 314 adjusts the longitudinal position 316 of the saw hub 24, the controller 18 receives a position signal 360 from the circular saw blade mounting assembly 20 where the position signal 360 identifies the longitudinal position 316 of the saw hub 24 relative to the base 301 and the TDC position 320. As the saw hub 24 translates, the controller 18 receives the position signal 360 from the as a continuously-changing voltage. When the saw hub 24 is disposed in its final position, the controller 18 receives the position signal 360 from the linear measurement device 326 as a substantially steady-state voltage and can detect the saw hub 24 as not moving. Based upon such detection, the controller 18 delinks the operation of the linear actuators 304, 306 in memory such that position signals transmitted to the respective linear actuators 304, 306 provide independent operation of the actuators 304, 306.

With the first and second linear actuators 304, 306 delinked, the controller 18 is configured to transmit the longitudinal position adjustment signal 366 to the second linear actuator 306 to adjust the longitudinal position 310 of the feed finger 30 to correspond with the radius of the circular saw blade 32. For example, the longitudinal position adjustment signal 366 is configured to adjust the longitudinal position 310 of the feed finger 30 relative to the TDC position 320 and the radius of the circular saw blade 32. With respect to the above-referenced example, in the case where the offset 350 is 0.1077 inches, the longitudinal position adjustment signal 366 causes the second actuator 306 to move the feed finger 30 a distance of 0.1077 inches relative to the TDC position 320 and along direction 324. With such positioning, the longitudinal position 310 of the feed finger 30 substantially corresponds to the radius of the circular saw blade (i.e., the updated radius 362 of the circular saw blade 32-2).

Following repositioning of the feed finger 30, the controller 18 is configured to electrically link the first linear actuator 304 with the second linear actuator 306 such that second linear actuator 306 is configured to operate in conjunction with the first linear actuator 304 to position the feed finger 30 along an arc defined by the longitudinal position of the saw hub 24. While the controller 18 can electrically link the first and second actuators 304, 306 in a variety of ways, in one arrangement, the controller 18 electrically links the linear actuators 304, 306 in memory to allow master-slave operation. With respect to the example above, with such electrical linking, the first and second linear actuators 304, 306 are configured to move the feed finger 30 along a 20-inch diameter arc.

With such repositioning the feed finger 30 is configured to rotate relative to the center of the circular saw blade mounting assembly 20 such that the feed finger 30 travels along an arc length defined by a circular saw blade 32 to be profiled.

As provided above, when electrically linked together, each of the first and second linear actuators 304, 306 are disposed in electrical communication with the controller 18 and the second linear actuator 306 is configured as a slave to the first linear actuator 304, which is configured as the master. As will be described below, the controller 18 is configured to provide command signals to the master and slave actuators 304, 306 which cause the actuators 304, 306 to move the feed finger 30 along an arc length that corresponds to, or mirrors, an arc shape associated with a given circular saw blade 32 and as defined by the position of the saw hub 24 relative to TDC position 320.

For example, with continued reference to FIG. 9, during operation the controller 18 is configured to transmit a first position signal 380 to the first linear actuator 304 which is configured to adjust the lateral position 308 of the feed finger 30 relative to the base 301 and TDC position 320. For example, the first position signal 380 can be configured as a number of encoder counts that causes the first linear actuator 304 to advance or retract the position of the feed finger 30.

As a result of transmitting the first position signal 380, the controller 18 is configured to receive a feedback signal 382 from the first linear actuator 304 which is configured to identify a location of the feed finger 30 relative to the base 301. For example, the feedback signal 382 can identify the position of the feed finger 30 relative to the home position (0.000", 0.000") of the feed finger 30 stored by the controller 18. In one arrangement, the controller 18 is configured to compare the feedback signal 382 to the home position of the first linear actuator 304 to identify the position of the feed finger 30 relative to the base 301 and TDC position 320.

Based upon the feedback signal 382 received from the first linear actuator 304, the controller 18 is configured to then transmit a second position signal 384, such as number of encoder counts, to the second linear actuator 308. The second signal position signal 384 is configured to adjust the longitudinal position 310 of the feed finger 30 relative to the base 301 and in relation to the longitudinal position 308 of the feed finger 30. With the combination of the lateral position adjustment 310 of the feed finger 30 and the longitudinal position adjustment 308 of the feed finger 30, the controller 18 is configured to move the feed finger 30 along an arc-shape to rotate the circular saw blade 32 about the saw hub 24 between a first arc position, such as indicated in FIG. 5, and a second arc position, such as indicated in FIG. 6.

In one arrangement, the controller 18 is configured to adjust a variety of aspects of the grinding system 10' to maintain the positioning of the feed finger 30 on a circular saw blade 32 relative to the TDC position 320. For example, with reference to FIG. 7, in one arrangement, based upon the adjusted distance between the saw hub 24 and TDC position 320 (e.g., as identified via the position signal 360 received from the circular saw blade mounting assembly 20), the controller 18 is configured to adjust grinding criteria 400 as applied by the grinding mechanism 14 to the circular saw blade 32.

The grinding criteria 400 as applied to a circular saw blade 32 can be configured in a variety of ways. In one arrangement, the grinding criteria 400 relates to the tooth profile geometry associated with the saw blade 32. In such an arrangement, the controller 18 is configured to adjust the tooth profile geometry generated by the grinding apparatus 14 on the circular saw blade 32. For example, the tooth profile geometry can be defined with the controller 18 by an operator based upon changes to base or preset circular sawblade characteristics such as diameter, number of teeth, or gullet shape.

Figure 11:
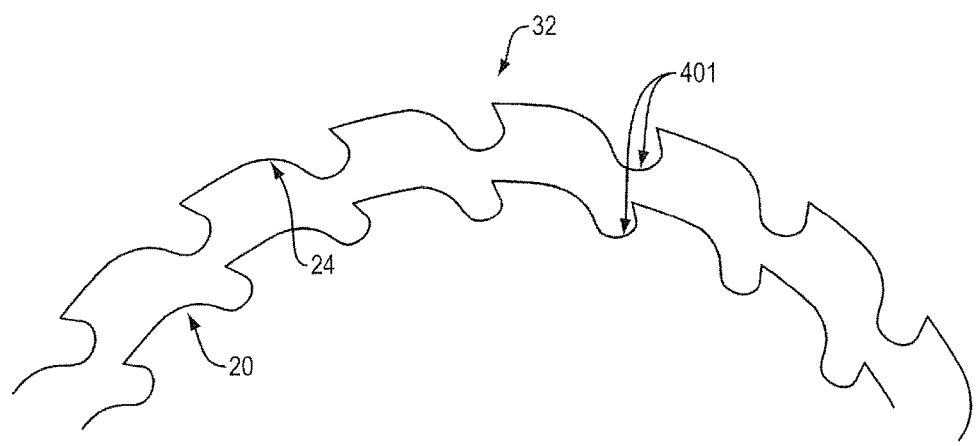
FIG. 11 illustrates saw blade tooth gullet geometry associated with a circular saw blade, according to one arrangement.

As the grinding system 10' grinds a given circular saw blade 32 multiple times to re-profile the circular saw blade teeth, the diameter of the circular saw blade 32 becomes reduced. As the circular saw blade 32 shrinks in diameter due to profile grinding, the controller 18 utilizes the position signal 360 received from the linear measurement device 326 to adjust the profile of a current circular saw blade 32 being sharpened. For example, assume the case where the operator has identified a circular saw blade 32 with the profile defined in controller 18 as having a 24-inch diameter (i.e., the base circular saw blade 32 is preset and predefined as having a 24-inch diameter). Further assume that after adjusting the position of the saw hub 24 such that the circular saw blade edge is disposed at the TDC position 320, the linear measurement device 326 provides a position signal 360 to the controller 18 that identifies the circular saw blade 32 as having a 20-inch diameter. Based upon a comparison of the saw blade diameter identification and the position signal 360, the controller 18 is conjured to recalculate the entire saw tooth profile to adjust for the shorter tooth pitch. In one arrangement, as indicated in FIG. 11, this is achieved by maintaining the saw blade tooth gullet geometry 401 and modifying the back length of each tooth when a circular saw blade 32 is progressively ground from a 24-inch diameter to a 20-inch diameter. By modifying the tooth this way, the operator can identify the circular saw blade 32 to the controller 18 based upon its preset, predefined size, regardless of the actual, physical saw blade diameter.

In one arrangement, the grinding criteria 400 relates to the speed of the indexing mechanism 21. In such an arrangement, the controller 18 is configured to adjust the speed of the indexing mechanism 21 during a grinding procedure.

For example, an operator can define an indexing mechanism (e.g., feed finger 30) speed with the controller 18 by inputting a Teeth Per Minute (TPM) value to the controller 18. Therefore, if the operator defines the indexing mechanism speed as 20 TPM, the controller 18 configures the feed finger 30 to retract in one second (e.g., Retract Time=($\frac{1}{3}$)*

(60/TPM) in order to have the feed finger retraction take up approximately 33% of the tooth grind time) and push a tooth of the circular saw blade 32 forward to the grinding apparatus 14 in two seconds (e.g., Forward Time=(⅔)*(60/TPM) in order to have the forwarding of the feed finger 30 utilize the remaining 66% of the tooth grind time to decelerate the overall grind time and to provide an enhanced finish to the circular saw blade 32).

However, as the grinding system 10' grinds a circular saw blade 32 multiple times to re-profile the circular saw blade teeth, the diameter of the circular saw blade 32 becomes reduced. Further, by definition, as the saw blade diameter shrinks the tooth pitch also shrinks, since Tooth Pitch=(Saw Diameter*PI)/Number of Teeth. To account for this reduction in tooth pitch, in one arrangement the controller 18 is configured to adjust both the retract velocity of the feed finger 30 (e.g., Retract Velocity=(Tooth Pitch+0.25)/(1 second) where 0.25" represents over travel to ensure the feed finger 30 picks up the tooth) and the forward velocity of the feed finger 30 (Forward Velocity=(Tooth Pitch+0.25)/(2 seconds) where 0.25" represents over travel to ensure the feed finger 30 picks up the tooth).

For example a 20 inch diameter, thirty-five tooth circular saw blade 32 operating at 20 TPM, retracts at 2.04 inches per second and feeds forward at 1.02 inches per second. When the operator moves the saw hub 24 to grind the same thirty-five tooth circular saw blade 32 but at a reduced 18 inch diameter, the controller 18 adjusts the feed finger retract speed to 1.87 inches per second and the feed forward speed to 0.93 inches per second. With such an adjustment, the controller 18 is configured to maintain the 1 second retract time and 2 second feed forward time, thereby enabling the grinding system 10' to run at 20 TPM, regardless of the diameter of the circular saw blade 32.

In another arrangement, to account for a reduction in tooth pitch caused by a reduction in saw blade diameter, the controller 18 is configured to maintain a constant forward velocity (based on the pre-defined or base profile) of the feed finger, such as a rate of 1.02 inches per second, and to adjust the retract velocity of the feed finger 30 to maintain the 20 TPM rate. For example, in the case of a thirty-five tooth circular saw blade 32 having the reduced 18 inch diameter, the feed finger 30 is required to feed forward in 1.8 seconds, rather than 2 seconds (e.g., 1.87 inches divided by 1.02 inches per second) thus maintaining the base feed forward velocity (e.g., the calculated value from the predefined saw parameters input to the controller 18 by the operator). In order to maintain a 20 TPM rate, retraction of the feed finger 30 should occur in about 1.2 seconds, rather than 1 second. To maintain the 20 TPM rate, the controller 18 is configured to adjust the retract velocity of the feed finger 30 to 1.56 inches per second, rather than 1.87 inches per second. With such adjustment, the velocity of the feed finger 30 during a grinding procedure is substantially consistent, thereby providing a substantially uniform finish as the circular saw blade 32 is ground to a smaller diameter.

This principle also applies to feeding forward and grinding. The grinding apparatus 14 is electronically linked to the feed finger 30 and, therefore, also changes its speed to match the speed of the feed finger 30.

In one arrangement, the grinding criteria 400 relates to a retract distance associated with the feed finger 30. In such an arrangement, the controller 18 is configured to adjust a retract distance associated with the feed finger 30 of the indexing mechanism 21.

Figure 12:
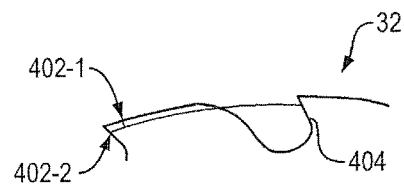
FIG. 12 illustrates arc position distance values associated with circular saw blades, according to one arrangement.

For example, with reference to FIG. 12, the controller 18 is configured to define a feed finger retract distance as about ¼" greater than the distance between a first arc position 402-1, 402-2 and a second arc position 404. This adjusts the feed finger start point to provide that the feed finger 30 contacts each tooth at substantially the same position and limits or prevents the feed finger 30 from retracting too far back past a given tooth and indexing two teeth instead of one. This also ensures that the tooth profile is ground correctly by picking up the correct tooth at the correct moment to provide a specific positional relationship between the feed finger 30 and the grinding apparatus 14.

Accordingly, while the controller 18 is configured to adjust the relative lateral positioning of the feed finger 30 relative to the TDC position 320, based upon the position of the saw hub 24, the controller 18 is also configured to adjust the velocity of the feed finger 30 based upon detected diameter of the sawblade.

As provides above, with the first and second linear actuators 304, 306 delinked, the controller 18 is configured to transmit the longitudinal position adjustment signal 366 to the second linear actuator 306 to adjust the longitudinal position 310 of the feed finger 30 to correspond with the radius of the circular saw blade 32. Such description is by way of example only. In one arrangement, the controller 18 is configured to adjust a lateral position 308 of the feed finger 30 relative to the TDC position 320 and the radius of the circular saw blade 32. For example, the controller 18 is configured to transmit a lateral position adjustment signal (not shown) to the first linear actuator 304 to adjust the lateral position 308 of the feed finger 30. With such adjustment, the lateral position 306 of the feed finger 30 substantially corresponds to the radius of the circular saw blade (i.e., the updated radius 362 of the circular saw blade 32-2). Further, in one arrangement, with the first and second linear actuators 304, 306 delinked, the controller 18 is configured to transmit both the longitudinal position adjustment signal 366 to the second linear actuator 306 and the lateral position adjustment signal to the first linear actuator 304 to adjust the longitudinal position 310 and the lateral position 308 of the feed finger 30 to correspond with the radius of the circular saw blade 32.

While various embodiments of the innovation have been particularly shown and described, it will be understood by those skilled in the art that various changes in form and details may be made therein without departing from the spirit and scope of the innovation as defined by the appended claims.

What is claimed is:

1. A circular saw blade indexing assembly, comprising:
 a base;
 a circular saw blade mounting assembly connected to the base and having a saw hub configured to support a circular saw blade;
 an indexing mechanism connected to the base and having a feed finger disposed at a radial distance from the saw hub, the feed finger configured to rotate the circular saw blade about the saw hub between a first arc position and a second arc position; and
 a radius adjustment mechanism configured to adjust a relative longitudinal position between the saw hub of the circular saw blade mounting assembly and the feed finger of the indexing mechanism;
 wherein the radius adjustment mechanism comprises a positioning actuator connected to the saw hub, the positioning actuator configured to adjust the longitudinal position of the saw hub relative to the feed finger; and wherein the radius adjustment mechanism further comprises a controller disposed in electrical communication with the circular saw blade mounting assembly and the indexing mechanism, the controller configured to:
receive a position signal from the circular saw blade mounting assembly, the position signal identifying the longitudinal position of the saw hub relative to the base;
detect a radius of the circular saw blade based upon the position signal; and
transmit a longitudinal position adjustment signal to the indexing mechanism to adjust a longitudinal position of the feed finger to correspond with the radius of the circular saw blade.

2. The circular saw blade indexing assembly of claim 1, wherein the positioning actuator comprises a linear measurement device configured to transmit the position signal to the controller.

3. The circular saw blade indexing assembly of claim 1, wherein the indexing mechanism comprises:
a first linear actuator configured to adjust a lateral position of the feed finger relative to the base; and
a second linear actuator configured to adjust a longitudinal position of the feed finger relative to the base.

4. The circular saw blade indexing assembly of claim 3, wherein the controller is configured to:
transmit a first position signal to the first linear actuator, the first position signal configured to adjust the lateral position of the feed finger relative to the base;
receive a feedback signal from the first linear actuator, the feedback signal configured to identify a location of the feed finger relative to the base; and
based upon the feedback signal received from the first linear actuator, transmit a second position signal to the second linear actuator, the second signal position signal configured to adjust the longitudinal position of the feed finger relative to the base, such that adjustment of the lateral position of the feed finger and the longitudinal position of the feed finger moves the feed finger along an arc-shape to rotate the circular saw blade about the saw hub between the first arc position and the second arc position.

5. The circular saw blade indexing assembly of claim 3, wherein when transmitting the longitudinal position adjustment signal to the indexing mechanism to adjust the longitudinal position of the feed finger to correspond with the radius of the circular saw blade, the controller is configured to:
electrically delink the first linear actuator from the second linear actuator such that the second linear actuator is configured to position the feed finger independent from the first linear actuator;
transmit the longitudinal position adjustment signal to the second linear actuator to adjust the longitudinal position of the feed finger to correspond with the radius of the circular saw blade; and
when the longitudinal position of the feed finger substantially corresponds to the radius of the circular saw blade, electrically linking the first linear actuator with the second linear actuator such that second linear actuator is configured to operate in conjunction with the first linear actuator to position the feed finger along an arc defined by the longitudinal position of the saw hub.

6. The circular saw blade indexing assembly of claim 5, wherein when transmitting the longitudinal position adjustment signal to the second linear actuator to adjust the longitudinal position of the feed finger to correspond with the radius of the circular saw blade, the controller is configured to transmit the longitudinal position adjustment signal to the second linear actuator to adjust the longitudinal position of the feed finger relative to a top dead center (TDC) position and the radius of the circular saw blade.

7. The circular saw blade indexing assembly of claim 1, wherein the controller is further configured to adjust a set of grinding criteria applied to the circular saw blade based upon the position signal received from the circular saw blade mounting assembly.

8. The circular saw blade indexing assembly of claim 7, wherein when adjusting the set of grinding criteria applied to the circular saw blade based upon the position signal received from the circular saw blade mounting assembly, the controller is configured to adjust at least one of a tooth profile geometry generated by the grinding apparatus, a speed of the indexing mechanism, and a retract distance associated with the feed finger of the indexing mechanism.

9. A grinding system, comprising:
a frame;
a grinding apparatus connected to the frame; and
a circular saw blade indexing assembly connected to the frame, comprising:
a base;
a circular saw blade mounting assembly connected to the base and having a saw hub configured to support a circular saw blade;
an indexing mechanism connected to the base and having a feed finger disposed at a radial distance from the saw hub, the feed finger configured to rotate the circular saw blade about the saw hub between a first arc position and a second arc position; and
a radius adjustment mechanism configured to adjust a relative longitudinal position between the saw hub of the circular saw blade mounting assembly and the feed finger of the indexing mechanism;
wherein the radius adjustment mechanism comprises a positioning actuator connected to the saw hub, the positioning actuator configured to adjust the longitudinal position of the saw hub relative to the feed finger;
wherein the radius adjustment mechanism further comprises a controller disposed in electrical communication with the circular saw blade mounting assembly and the indexing mechanism, the controller configured to:
receive a position signal from the circular saw blade mounting assembly, the position signal identifying the longitudinal position of the saw hub relative to the base;
detect a radius of the circular saw blade based upon the position signal; and
transmit a longitudinal position adjustment signal to the indexing mechanism to adjust a longitudinal position of the feed finger to correspond with the radius of the circular saw blade.

10. The grinding system of claim 9, wherein the positioning actuator comprises a linear measurement device configured to transmit the position signal to the controller.

11. The grinding system of claim 9, wherein the indexing mechanism comprises:
a first linear actuator configured to adjust a lateral position of the feed finger relative to the base; and
a second linear actuator configured to adjust a longitudinal position of the feed finger relative to the base.

12. The grinding system of claim 11, wherein the controller is configured to:

transmit a first position signal to the first linear actuator, the first position signal configured to adjust the lateral position of the feed finger relative to the base;

receive a feedback signal from the first linear actuator, the feedback signal configured to identify a location of the feed finger relative to the base; and based upon the feedback signal received from the first linear actuator, transmit a second position signal to the second linear actuator, the second signal position signal configured to adjust the longitudinal position of the feed finger relative to the base, such that adjustment of the lateral position of the feed finger and the longitudinal position of the feed finger moves the feed finger along an arc-shape to rotate the circular saw blade about the saw hub between the first arc position and the second arc position.

13. The grinding system of claim 11, wherein when transmitting the longitudinal position adjustment signal to the indexing mechanism to adjust the longitudinal position of the feed finger to correspond with the radius of the circular saw blade, the controller is configured to:

electrically delink the first linear actuator from the second linear actuator such that the second linear actuator is configured to position the feed finger independent from the first linear actuator;

transmit the longitudinal position adjustment signal to the second linear actuator to adjust the longitudinal position of the feed finger to correspond with the radius of the circular saw blade; and when the longitudinal position of the feed finger substantially corresponds to the radius of the circular saw blade, electrically linking the first linear actuator with the second linear actuator such that second linear actuator is configured to operate in conjunction with the first linear actuator to position the feed finger along an arc defined by the longitudinal position of the saw hub.

14. The grinding system of claim 13, wherein when transmitting the longitudinal position adjustment signal to the second linear actuator to adjust the longitudinal position of the feed finger to correspond with the radius of the circular saw blade, the controller is configured to transmit the longitudinal position adjustment signal to the second linear actuator to adjust the longitudinal position of the feed finger relative to a top dead center (TDC) position and the radius of the circular saw blade.

15. The grinding system of claim 9, wherein the controller is further configured to adjust a set of grinding criteria applied to the circular saw blade based upon the position signal received from the circular saw blade mounting assembly.

16. The grinding system of claim 15, wherein when adjusting the set of grinding criteria applied to the circular saw blade based upon the position signal received from the circular saw blade mounting assembly, the controller is configured to adjust at least one of a tooth profile geometry generated by the grinding apparatus, a speed of the indexing mechanism, and a retract distance associated with the feed finger of the indexing mechanism.

17. A circular saw blade indexing assembly, comprising:
a base;
a circular saw blade mounting assembly connected to the base and having a saw hub configured to support a circular saw blade;
an indexing mechanism connected to the base and having a feed finger disposed at a radial distance from the saw hub, the feed finger configured to rotate the circular saw blade about the saw hub between a first arc position and a second arc position; and
a controller disposed in electrical communication with the circular saw blade mounting assembly and the indexing mechanism, the controller configured to:
receive a position signal from the circular saw blade mounting assembly, the position signal identifying a longitudinal position of the saw hub relative to the base;
detect a radius of the circular saw blade based upon the position signal; and
transmit a longitudinal position adjustment signal to the indexing mechanism to adjust a longitudinal position of the feed finger to correspond with the radius of the circular saw blade.

18. The circular saw blade indexing assembly of claim 17, wherein the controller is further configured to adjust a set of grinding criteria applied to the circular saw blade based upon the position signal received from the circular saw blade mounting assembly.

19. A grinding system, comprising:
a frame;
a grinding apparatus connected to the frame; and
a circular saw blade indexing assembly connected to the frame, comprising:
a base;
a circular saw blade mounting assembly connected to the base and having a saw hub configured to support a circular saw blade;
an indexing mechanism connected to the base and having a feed finger disposed at a radial distance from the saw hub, the feed finger configured to rotate the circular saw blade about the saw hub between a first arc position and a second arc position; and
a controller disposed in electrical communication with the circular saw blade mounting assembly and the indexing mechanism, the controller configured to:
receive a position signal from the circular saw blade mounting assembly, the position signal identifying a longitudinal position of the saw hub relative to the base;
detect a radius of the circular saw blade based upon the position signal; and
transmit a longitudinal position adjustment signal to the indexing mechanism to adjust a longitudinal position of the feed finger to correspond with the radius of the circular saw blade.

20. The grinding system of claim 19, wherein the controller is further configured to adjust a set of grinding criteria applied to the circular saw blade based upon the position signal received from the circular saw blade mounting assembly.

* * * * *